(12) United States Patent
Ariyavisitakul et al.

(10) Patent No.: US 8,750,089 B2
(45) Date of Patent: Jun. 10, 2014

(54) METHOD AND SYSTEM FOR ITERATIVE DISCRETE FOURIER TRANSFORM (DFT) BASED CHANNEL ESTIMATION USING MINIMUM MEAN SQUARE ERROR (MMSE) TECHNIQUES

(75) Inventors: Sirikiat Ariyavisitakul, Alpharetta, GA (US); Jun Zheng, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1010 days.

(21) Appl. No.: 12/732,975

(22) Filed: Mar. 26, 2010

(65) Prior Publication Data

US 2011/0164557 A1     Jul. 7, 2011

Related U.S. Application Data

(60) Provisional application No. 61/292,368, filed on Jan. 5, 2010.

(51) Int. Cl.
| | | |
|---|---|---|
| H04J 11/00 | (2006.01) | |
| H04L 25/02 | (2006.01) | |
| H04L 25/03 | (2006.01) | |
| H04L 1/00 | (2006.01) | |

(52) U.S. Cl.
CPC ........ H04L 25/0204 (2013.01); H04L 25/0242 (2013.01); *H04L 25/024* (2013.01); *H04L 2025/03611* (2013.01); *H04L 1/005* (2013.01)
USPC .......... 370/208; 370/209; 370/210; 375/260; 375/232; 375/246

(58) Field of Classification Search
None
See application file for complete search history.

(56) References Cited

U.S. PATENT DOCUMENTS

| | | | | |
|---|---|---|---|---|
| 5,318,031 | A * | 6/1994 | Mountford et al. | 600/410 |
| 5,465,276 | A * | 11/1995 | Larsson et al. | 375/346 |
| 5,535,225 | A * | 7/1996 | Mayhew et al. | 714/785 |
| 6,069,764 | A * | 5/2000 | Morris et al. | 360/77.04 |
| 6,115,500 | A * | 9/2000 | Hsu et al. | 382/248 |
| 6,141,393 | A * | 10/2000 | Thomas et al. | 375/347 |
| 6,411,649 | B1 * | 6/2002 | Arslan et al. | 375/232 |
| 6,732,328 | B1 * | 5/2004 | McEwen et al. | 714/795 |
| 7,633,849 | B1 * | 12/2009 | Al-Rawi et al. | 370/208 |
| 7,639,660 | B2 * | 12/2009 | Kim et al. | 370/343 |
| 8,165,229 | B2 * | 4/2012 | Paik et al. | 375/260 |
| 2002/0181624 | A1 * | 12/2002 | Gonzalez et al. | 375/346 |
| 2003/0108117 | A1 * | 6/2003 | Ketchum et al. | 375/295 |
| 2003/0112775 | A1 * | 6/2003 | Molnar | 370/335 |
| 2003/0147476 | A1 * | 8/2003 | Ma et al. | 375/329 |
| 2003/0235255 | A1 * | 12/2003 | Ketchum et al. | 375/285 |

(Continued)

*Primary Examiner* — Ian N Moore
*Assistant Examiner* — Dung B Huynh
(74) *Attorney, Agent, or Firm* — Sterne, Kessler, Goldstein & Fox P.L.L.C.

(57) ABSTRACT

A method and system for iterative discrete Fourier transform (DFT) based channel estimation using minimum mean square error (MMSE) techniques are presented. Aspects of the method and system include a procedure for computing channel estimates in both the time domain and frequency domain (or mixed domain) using an iterative DFT method based on MMSE techniques. One aspect of the method and system may achieve low computational complexity and produce more accurate channel estimate values in low signal to noise ratio (SNR) regimes in comparison to conventional DFT-based channel estimation methods, which utilize least squares (LS) techniques. The method and system disclosed herein may be practiced in connection with a wide range of orthogonal frequency division multiplexing (OFDM) based systems, for example wireless local area networks (WLAN, for example IEEE 802.11 WLAN systems), and LTE systems.

20 Claims, 5 Drawing Sheets

(56) References Cited

U.S. PATENT DOCUMENTS

| | | | |
|---|---|---|---|
| 2004/0066740 A1* | 4/2004 | Suh et al. | 370/208 |
| 2004/0066773 A1* | 4/2004 | Sun et al. | 370/343 |
| 2004/0072594 A1* | 4/2004 | Hwang et al. | 455/562.1 |
| 2005/0063298 A1* | 3/2005 | Ling et al. | 370/208 |
| 2005/0113142 A1* | 5/2005 | Felter | 455/562.1 |
| 2005/0157801 A1* | 7/2005 | Gore et al. | 375/260 |
| 2005/0180534 A1* | 8/2005 | Brotje et al. | 375/350 |
| 2005/0265429 A1* | 12/2005 | Cho et al. | 375/135 |
| 2006/0012520 A1* | 1/2006 | Tsai et al. | 342/377 |
| 2006/0034163 A1* | 2/2006 | Gore et al. | 370/208 |
| 2006/0159196 A1* | 7/2006 | Kwun et al. | 375/267 |
| 2006/0203710 A1* | 9/2006 | Mukkavilli et al. | 370/208 |
| 2006/0227812 A1* | 10/2006 | Vrcelj et al. | 370/503 |
| 2007/0036179 A1* | 2/2007 | Palanki et al. | 370/491 |
| 2007/0036239 A1* | 2/2007 | Ma et al. | 375/316 |
| 2007/0064824 A1* | 3/2007 | Wang et al. | 375/260 |
| 2007/0183517 A1* | 8/2007 | Liu et al. | 375/260 |
| 2007/0189404 A1* | 8/2007 | Baum et al. | 375/260 |
| 2008/0137769 A1* | 6/2008 | Hwang et al. | 375/267 |
| 2008/0316909 A1* | 12/2008 | Yousef | 370/208 |
| 2009/0121936 A1* | 5/2009 | Maltsev et al. | 342/377 |
| 2009/0129489 A1* | 5/2009 | Eldar et al. | 375/260 |
| 2009/0161781 A1* | 6/2009 | Kolze | 375/260 |
| 2010/0046666 A1* | 2/2010 | Ketchum et al. | 375/296 |
| 2010/0054322 A1* | 3/2010 | Hui et al. | 375/232 |
| 2010/0150000 A1* | 6/2010 | Sakata | 370/252 |
| 2010/0232525 A1* | 9/2010 | Xia et al. | 375/259 |
| 2010/0317305 A1* | 12/2010 | Sahlin | 455/181.1 |
| 2011/0090975 A1* | 4/2011 | Al-Naffouri et al. | 375/260 |

* cited by examiner

METHOD AND SYSTEM FOR ITERATIVE DISCRETE FOURIER TRANSFORM (DFT) BASED CHANNEL ESTIMATION USING MINIMUM MEAN SQUARE ERROR (MMSE) TECHNIQUES

CROSS-REFERENCE TO RELATED APPLICATIONS/INCORPORATION BY REFERENCE

This application makes reference to, claims priority to, and claims the benefit of U.S. Provisional Application Ser. No. 61/292,368 filed Jan. 5, 2010.

FIELD OF THE INVENTION

Certain embodiments of the invention relate to communication networks. More specifically, certain embodiments of the invention relate to a method and system for iterative discrete Fourier transform (DFT) based channel estimation using minimum mean square error (MMSE) techniques.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. The $3^{rd}$ Generation Partnership Project (3GPP) is a collaboration among telecommunications associations from around the world whose purpose is to develop standards for wireless networks, which meet the demands of the mobile Internet. One of the projects undertaken by the 3GPP toward this end is referred to as the 3GPP long term evolution (3GPP LTE) project. The 3GPP LTE project has a broad set of objectives relating to specifications for data transfer rates and frequency spectrum utilization in wireless communication networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for iterative discrete Fourier transform (DFT) based channel estimation using minimum mean square error (MMSE) techniques, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for iterative discrete Fourier transform (DFT) based channel estimation using minimum mean square error (MMSE) techniques. Various embodiments of the invention comprise a procedure for computing channel estimates in both the time domain and frequency domain (or mixed domain) using an iterative DFT method based on MMSE techniques. Various embodiments of the invention may achieve low computational complexity and produce more accurate channel estimate values in low signal to noise ratio (SNR) regimes in comparison to conventional DFT-based channel estimation methods, which utilize least squares (LS) techniques. Various embodiments of the invention may be practiced in connection with a wide range of orthogonal frequency division multiplexing (OFDM) based systems, for example wireless local area networks (WLAN, for example IEEE 802.11 WLAN systems), and LTE systems.

Figure 1:
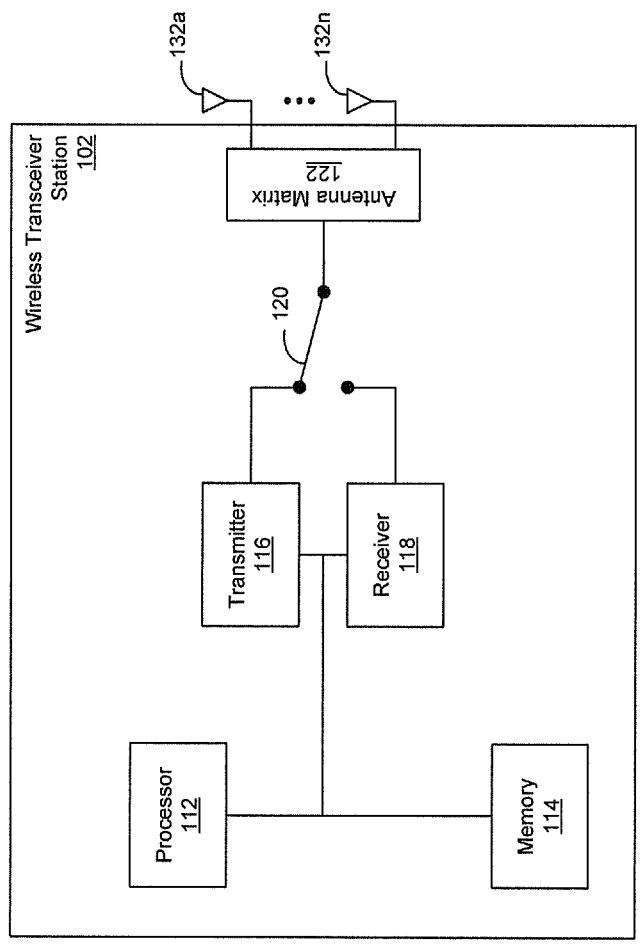
FIG. 1 is a block diagram of an exemplary MIMO transceiver, which may be utilized in connection with an embodiment of the invention.

FIG. 1 is a block diagram of an exemplary MIMO transceiver, which may be utilized in connection with an embodiment of the invention. Referring to FIG. 1, there is shown a wireless transceiver station 102 and a plurality of antennas 132a ... 132n. The wireless transceiver station 102 is an exemplary wireless communication device, which may be utilized at an access point (AP) device or at a station (STA) device in a wireless communication system. The plurality of antennas 132a ... 132n may enable the wireless transceiver station 102 to transmit and/or receive signals, for example radio frequency (RF) signals, via a wireless communication medium. The wireless transceiver station 102 shown in FIG. 1 may also be depicted as comprising one or more transmitting antennas, which are coupled to the transmitter 116 and one or more receiving antennas, which may be coupled to the receiver 118 without loss of generality.

The exemplary wireless transceiver station comprises a processor 112, a memory 114, a transmitter 116, a receiver 118, a transmit and receive (T/R) switch 120 and an antenna matrix 122. The antenna matrix 122 may enable selection of one or more of the antennas 132a ... 132n for transmitting and/or receiving signals at the wireless transceiver station 102. The T/R switch 120 may enable the antenna matrix 122 to be communicatively coupled to the transmitter 116 or receiver 118. When the T/R switch 120 enables communicative coupling between the transmitter 116 and the antenna matrix 122, the selected antennas 132a ... 132n may be utilized for transmitting signals. When the T/R switch 120 enables communicative coupling between the receiver 118 and the antenna matrix 122, the selected antennas 132a ... 132n may be utilized for receiving signals.

The transmitter 116 may enable the generation of signals, which may be transmitted via the selected antennas 132a ... 132n. The transmitter 116 may generate signals by performing coding functions, signal modulation and/or signal modulation. In various embodiments of the invention, the transmitter 116 may enable generation of signals using precoding and/or beamforming techniques.

The receiver 118 may enable the processing of signals received via the selected antennas 132a ... 132n. The receiver 118 may generate data based on the received signals by performing signal amplification, signal demodulation and/or decoding functions. In various embodiments of the invention, the receiver 118 may enable generation of data, which may be utilized by the transmitter 116 for precoding and/or beamforming of generated signals.

The processor 112 may enable the generation of transmitted data and/or the processing of received data. The processor 112 may generate data, which is utilized by the transmitter 116 to generate signals. The processor 112 may process data generated by the receiver 118. In various embodiments of the invention in a node B, the processor 112 may process data received by the receiver 118 and generate coefficient data, which may be utilized by the transmitter 116 for precoding and/or beamforming of generated signals. The coefficient data may be stored in the memory 114.

In various embodiments of the invention, in a STA for example, the processor 112 may enable computation of channel estimates based on received signals. The processor 112 within the STA may compute the channel estimates based on preamble data communicated by the receive signals by performing DFT-based channel estimation using MMSE techniques. The preamble data may comprise a plurality of symbols referred to as pilot symbols. The pilot symbols may be transmitted by an AP utilizing one or more frequencies referred to as pilot tones. For example, in an exemplary embodiment of the invention, each of the pilot symbols may be transmitted by utilizing of a plurality of pilot tones. Each of the pilot tone may comprise an OFDM symbol, each of which comprises a plurality of tones selected from within an RF channel bandwidth. The memory 114 within the STA may be utilized to store pilot data, which comprises known values for the preamble symbols and corresponding pilot tone frequencies. The memory 114 within the STA may also be utilized to store one or more time domain to frequency domain transformation matrices. The processor 112 within the STA may utilize the received signals, the stored one or more time domain to frequency domain transformation matrices and the stored pilot data to iteratively compute channel estimate values corresponding to pilot tones and non-pilot tones by utilizing a method and system for iterative DFT based channel estimation using MMSE techniques.

Figure 2:
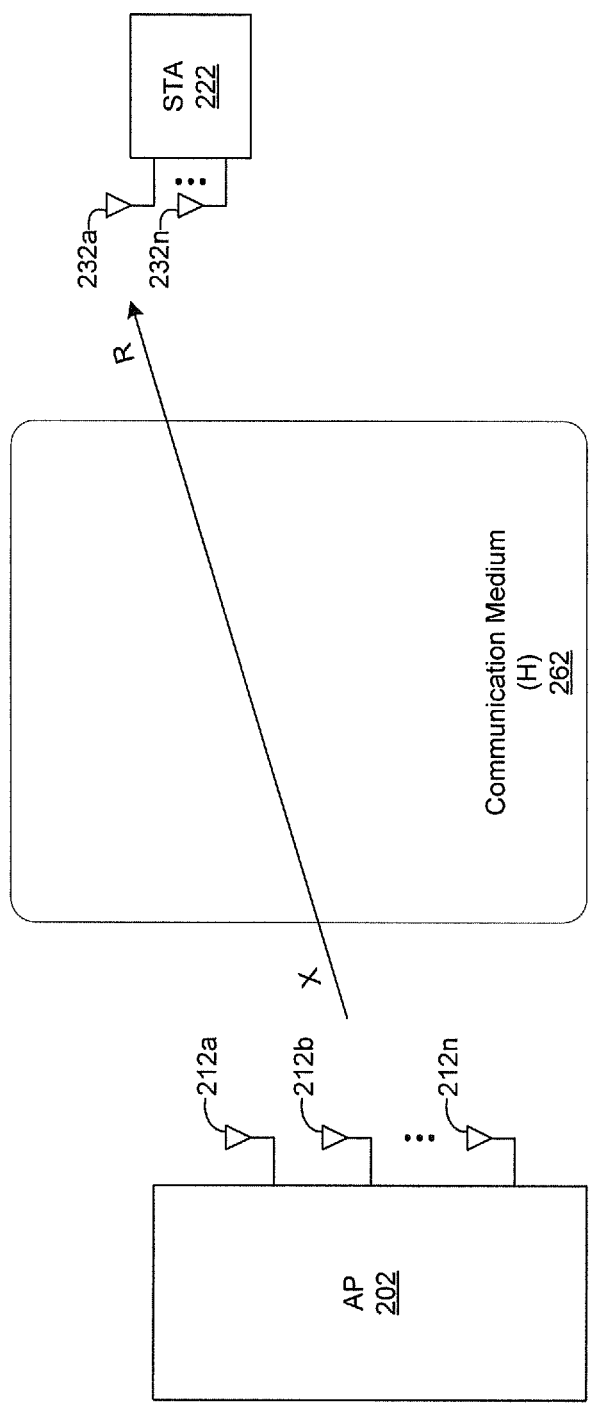
FIG. 2 is a block diagram of an exemplary multiple user MIMO system, which may be utilized in connection with an embodiment of the invention.

FIG. 2 is a block diagram of an exemplary MIMO system, which may be utilized in connection with an embodiment of the invention. Referring to FIG. 2, there is shown an AP 202 with a plurality of antennas 212a, 212b, ..., 212n, a STA 222 with a plurality of antennas 232a ... 232n, and a communication medium 262. The plurality of antennas 212a, 212b, ..., 212n may be utilized to enable transmission and/or reception of signals at the AP 202. The plurality of antennas 232a ... 232n may be utilized to enable transmission and/or reception of signals at the STA 222. For example, the AP 202 may generate signals, which may be transmitted via one or more of the antennas 212a, 212b, ..., 212n and received at the STA 222 via one or more of the antennas 232a, 232b, ..., 232n. The signals transmitted by the AP 202 may be represented by a transmitted signal vector, X. The signals received by the STA 222 may be represented by a received signal vector, R. The number of antennas 212a, 212b, ..., 212n and the number of antennas 232a, 232b, ..., 232n may be independently configured.

Transmitted signal vector X may comprise preamble data. The preamble data may comprise a plurality of pilot symbols. Each of the pilot symbols may be transmitted via a corresponding plurality of pilot tone frequencies. Each of the transmitted pilot symbols may comprise a corresponding determined magnitude and/or phase for each of the pilot tone frequencies. The magnitude and/or phase of signals associated with transmitted signal vector X may be altered while propagating through the communication medium 262. The alteration of transmitted signal vector X may result in modification of the magnitude and/or phase of signals associated with transmitted signal vector X. Received signal vector R represents a version of transmitted signal vector X, which has been altered as a result of propagation through the communication medium 262. The alteration of the magnitude and/or phase of transmitted signal vector X is represented by a channel matrix, H. Channel matrix H is a characterization of the radio frequency (RF) channel from the antennas 212a, 212b, 212n, to the antennas 232a, 232b, ..., 232n, via the communication medium 262.

The STA 222 may compute a channel estimate channel matrix, $\hat{H}$, based on preamble data communicated via received signal vector R and based on determined magnitude and/or phase for pilot symbols communicated within the received preamble data. Channel estimate matrix $\hat{H}$ represented a computed estimate of channel matrix H. In various embodiments of the invention, the STA 222 may compute channel estimate matrix $\hat{H}$ by utilizing a method and system for iterative DFT based channel estimation using MMSE techniques.

In various embodiments of the invention, the pilot tone frequencies may be interspersed among frequency tones that are utilized to transmit data. For example, within a given OFDM symbol, a portion of the tones associated with the OFDM symbol may be utilized to transmit data while a distinct portion of the tones associated with the OFDM symbol may comprise pilot tones. In an exemplary embodiment of the invention, a given pilot tone may be followed by a plurality of tones utilized to transmit data, which may then be followed by a subsequent pilot tone. In an exemplary embodiment of the invention, an OFDM symbol may comprise a plurality of M tones, of which a plurality of L tones comprise pilot tones and a plurality of M−L tones comprise non-pilot tones (which include tones utilized to transmit data).

In various embodiments of the invention, the plurality of L pilot tones may be utilized to compute a channel estimate matrix corresponding to the pilot tone frequencies, $\hat{H}_P$. Various embodiments of the invention comprise an iterative method to compute a channel estimate matrix corresponding to the non-pilot tone frequencies, $\hat{H}_Q$, based on the computed channel estimate matrix $\hat{H}_P$.

Figure 3:
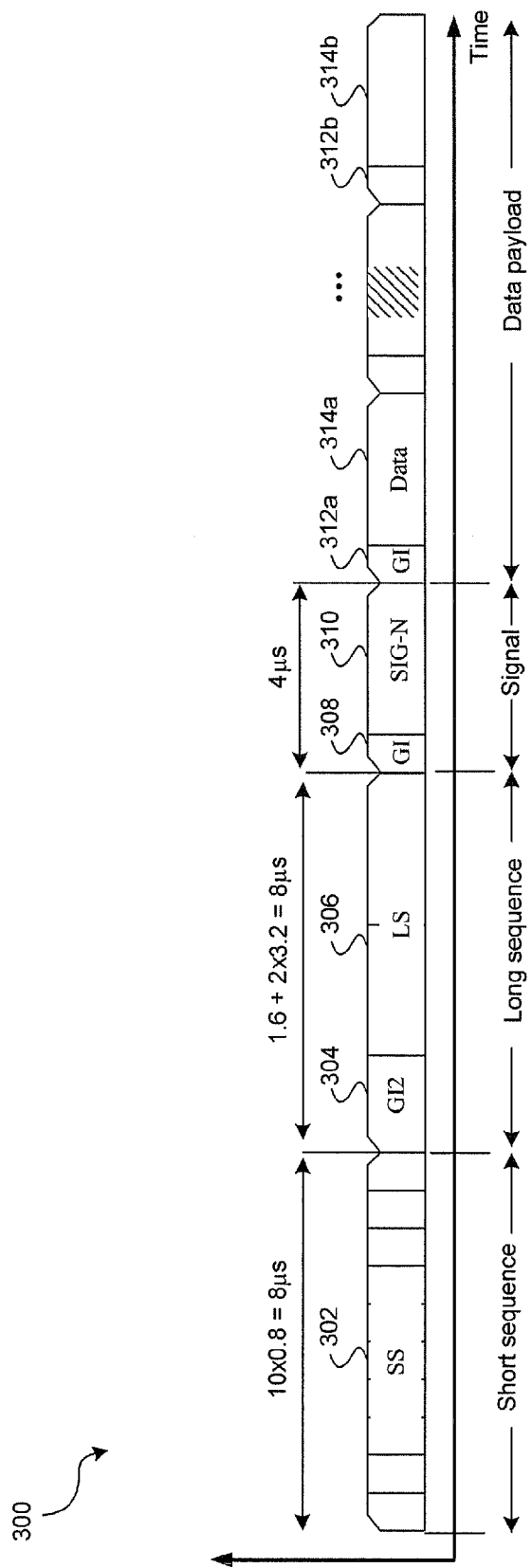
FIG. 3 is a diagram that illustrates an exemplary IEEE 802.11 frame, which may be utilized in connection with an embodiment of the invention.

FIG. 3 is a diagram that illustrates an exemplary IEEE 802.11 frame, which may be utilized in connection with an embodiment of the invention. With reference to FIG. 3, there is shown a frame, or physical layer protocol data unit (PPDU) 300. The PPDU 300 may comprise a short sequence (SS) field 302, a training symbol guard interval (GI2) field 304, a long sequence (LS) field 306, a guard interval (GI) field 308, a signal (SIG-N) field 310, a plurality of guard interval fields 312a ... 312b, and a plurality of data fields 314a ... 314b. The preamble of the PPDU may comprise the SS field 302, and LS field 306. Data within each of the fields 302, 306, 310, 314a, ..., 314b may be encoded as an OFDM symbol and transmitted via an RF channel.

SS field 302 may comprise a plurality of short training sequence symbols. In an exemplary embodiment of the invention, SS field 302 comprises 10 short training sequence symbols. Each short training sequence symbol may comprise a defined time interval, for example, 800 nanoseconds (ns). The duration of SS field 302 may comprise a time interval, for example, about 8 microseconds (μs). SS field 302 may be utilized by a receiver, for example, the STA 222, for a plurality of reasons, for example, signal detection, automatic gain control (AGC) for low noise amplification circuitry, diversity selection such as performed by rake receiver circuitry, coarse frequency offset estimation, and timing synchronization.

Training symbol guard interval field 304 may comprise a time interval that separates, in time, receipt or transmission of a subsequent symbol in the PPDU. The duration of training symbol guard interval field 304 may comprise a time interval, for example, about 1.6 μs. Training symbol guard interval field 304 may be utilized by the AP 202, for example, to reduce the likelihood of inter-symbol interference between a preceding symbol, for example, a symbol transmitted during SS field 302, and a succeeding symbol, for example, a symbol transmitted during LS field 306.

LS field 306 may comprise a plurality of long training symbols, for example, 2 long training symbols. Each long training symbol may comprise transmission of information for a defined time interval, for example, about 3.2 μs. In various embodiments of the invention, each of the long training sequences in LS field 306 may comprise a pilot symbol. The duration of the long training sequence, including the duration of LS field 306, and the preceding training symbol guard interval field 304, may comprise a time interval of, for example, about 8 μs. LS field 306 may be utilized by the STA 222, for example, for a plurality of reasons, for example, to perform fine frequency offset estimation, and/or channel estimation.

The guard interval field 308 may comprise a time interval that separates, in time, receipt or transmission of a subsequent symbol in the PPDU. The duration of guard interval field 308 may comprise a time interval, for example, about 800 ns. The guard interval field 308 may be utilized by the AP 202, for example, to reduce the likelihood of inter-symbol interference between a preceding symbol, for example, a symbol transmitted during LS field 306, and a succeeding symbol, for example, a symbol transmitted during SIG-N field 310.

SIG-N field 310 may comprise, for example, a signal symbol. Each signal symbol may comprise transmission of information for a defined time interval, for example, about 3.2 μs. The signal field 310 may be utilized by the AP 202, for example, to implement transmission parameter signaling (TPS). The duration of the single symbol, including the duration of SIG-N field 310, and the preceding guard interval field 308, may comprise a time interval, for example, about 4 μs. The SIG-N field 310 may be utilized by the STA 222, for example, to establish a plurality of configuration parameters associated with receipt of the data payload portion of the PPDU 300.

The guard interval field 312a may comprise a time interval that separates, in time, receipt or transmission of a subsequent symbol in the PPDU. The duration of guard interval field 312a may comprise a time interval, for example, about 800 ns. The guard interval field 312a may be utilized by an the AP 202, for example, to reduce the likelihood of inter-symbol interference between a preceding symbol, for example, a symbol transmitted during a signal SIG-N field 310, and a succeeding symbol, for example, a symbol transmitted during a the data field 314a. Each successive guard interval field in the plurality of guard interval fields 312a, ..., 312b may be utilized by the AP 202, for example, to reduce the likelihood of inter-symbol interference between a preceding symbol, for example, a symbol transmitted during the plurality of data fields 314a, ..., 314b, and a succeeding symbol in the plurality of data fields 314a, ..., 314b.

A data field 314a, in the plurality of data fields 314a, ..., 314b, may comprise, for example, a data symbol. Each data symbol may comprise a defined time interval, for example, about 3.2 μs. The duration of each data interval, including the duration of a data field in the plurality of data fields 314a, ..., 314b, and the preceding guard interval field in the plurality of guard interval fields 312a, ..., 312b, may comprise a time interval, for example, about 4 μs. The plurality of data fields 314a, ..., 314b may be utilized by a receiver, for example the STA 222, to receive data that is contained in the data payload portion of PPDU 300.

In various embodiments of the invention, each of the data fields 314a, ..., 314b may correspond to an OFDM symbol. One or more of the data fields 314a, ..., 314b may each comprise one or more pilot tones.

Figure 4:
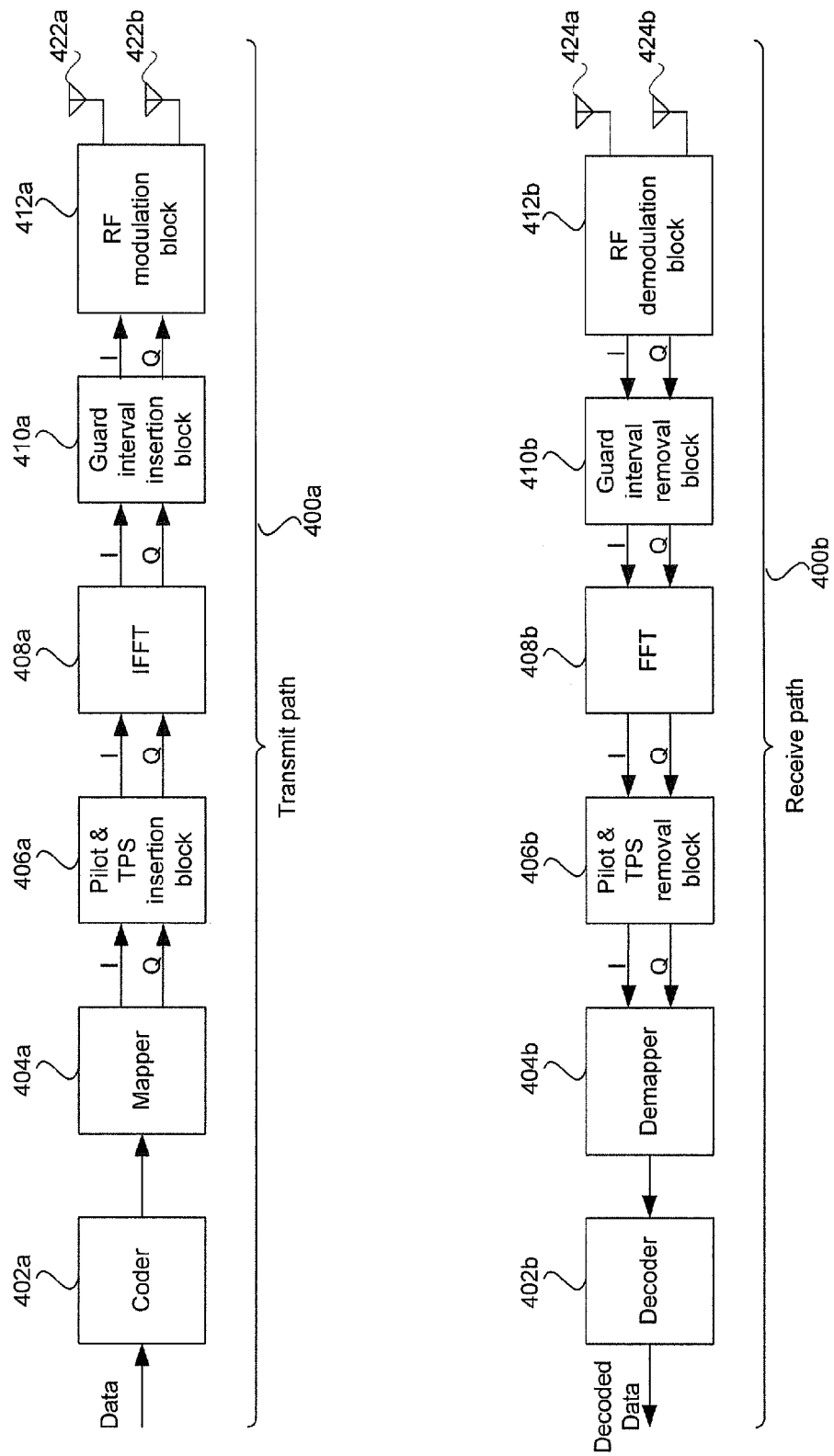
FIG. 4 is a block diagram illustrating exemplary signal transmission and signal reception paths, which may be utilized in connection with an embodiment of the invention.

FIG. 4 is a block diagram illustrating exemplary signal transmission and signal reception paths, which may be utilized in connection with an embodiment of the invention. Referring to FIG. 4, there is shown a transmit path 400a and a receive path 400b. In an exemplary embodiment of the invention, and with reference to FIG. 2, the AP 202 may utilize the exemplary transmit path 400a to generate and transmit signal vector X while the STA 222 may utilize the exemplary receive path 400b to receive signal vector R.

The transmit path 400a may comprise a coder 402a, a mapper 404a, a pilot and transmission parameter signaling (TPS) insertion block 406a, an inverse fast Fourier transform (IFFT) block 408a, a guard interval insertion block 410a, a radio frequency (RF) modulation block 412a, and a plurality of antennas 422a and 422b. The receive path 400b may comprise a plurality of antennas 424a and 424b, an RF demodulation block 412b, a guard interval removal block 410b, a fast Fourier transform (FFT) block 408b, a pilot and TPS removal block 406b, a demapper 404b and an decoder 402b.

The coder 402a may comprise suitable logic, circuitry, and/or code that may be adapted to receive data and generate error detection and/or error correction codes that may be computed based on at least a portion of the bits contained in the received data. For example, the coder 402a may be adapted generated coded data based on the received data by, for example, performing Reed-Solomon forward error correction (FEC) code generation and/or binary convolutional code (BCC) generation. The coder 402a may output the coded data.

The mapper 404a may comprise suitable logic, circuitry, and/or code that may be adapted to map one or more bits received from the coder 402a to a symbol based on a specified modulation constellation. For example, the mapper 404a may be adapted to perform X-QAM, where X indicates the size of the constellation to be used for quadrature amplitude modulation (QAM). The selection of a value for X may correspond to a modulation type. The mapper 404a may be configured to select a modulation type that may be utilized for mapping bits to symbols. Examples of modulation types may comprise binary phase shift keying (BPSK), quaternary phase shift keying (QPSK), 16-QAM, or 64-QAM, for example. The mapping performed by the mapper 404a may produce a modulated signal that comprises an in-phase (I) component and a quadrature phase (Q) component, for example. The signal generated by the mapper 404a may comprise a plurality of symbols. Each of the symbols contained in the signal may be referred to as an OFDM symbol. An OFDM symbol may be associated with a plurality of frequency carriers, or tones, where a tone may represent a signal that is transmitted at a given carrier frequency. Each tone associated with an OFDM symbol may utilize a different carrier frequency. Distinct portions of the bits encoded into the OFDM symbol by the mapper 404a may be associated with corresponding distinct tones.

The pilot and TPS insertion block 406a may comprise suitable logic, circuitry, and/or code that may be adapted to insert pilot tones, OFDM pilot symbols and/or transmission parameter symbols into the signal generated by the mapper 404a. Each of the pilot symbols may be associated with a corresponding tone, which is selected from a plurality of tones, which may be utilized for transmission of pilot symbols. Each of the pilot symbols may comprise a determined magnitude and/or phase. Individual pilot tones may be associated with a pilot tone position. For example, in instances where an OFDM pilot symbol is inserted by the pilot and TPS insertion block, each of the pilot tones may be associated with a pilot tone position, which indicates which of the frequencies within an OFDM symbol bandwidth are to be utilized to transmit pilot tones. In instances where the pilot tones are interspersed with non-pilot tones, the pilot tone position may indicate which of the frequencies within the OFDM symbol bandwidth are to be utilized to transmit pilot tones and which frequencies are to be associated with non-pilot tones.

The IFFT 408a may comprise suitable logic, circuitry, and/or code that may be adapted to perform an IFFT or inverse discrete Fourier transform (IDFT) operation on the signal output from the pilot and TPS insertion block 406a. The IFFT 408a may be characterized by a number of points where the number of points in the IFFT or IDFT implementation and may be equal to, or greater than the number of frequency carriers associated with an OFDM symbol. When the OFDM symbol is a pilot symbol, or when an OFDM symbol comprises interspersed pilot tones, selected points in the IFFT or IDFT implementation may correspond to distinct pilot tones. These selected points may be identified based on the corresponding pilot position for each of the pilot tones. In an exemplary embodiment of the invention, the number of points utilized by the IFFT 408a may be set to a configurable value ranging from 64 points to 8,192 points. The signal output by the IFFT 408a may be referred to as a spatial stream.

The guard interval insertion block 410a may comprise suitable logic, circuitry, and/or code that may be adapted to insert one or more guard intervals into the spatial stream. Each guard interval may comprise a time duration that separates the ending of one symbol in the spatial stream from the beginning of the next symbol. The time duration of the guard interval inserted by the guard interval insertion block 410a may be set to a configurable value ranging from 400 ns and 800 ns, for example.

The RF modulation block 412a may comprise suitable logic, circuitry, and/or code that may be adapted to modulate the spatial stream by utilizing a plurality of frequency carriers. The number of frequency carriers utilized may be configurable and may differ in number for a signal transmitted via an IEEE 802.11 channel, an IEEE 802.16 channel, or a DVB-H channel, for example. The frequency spacing between frequency carriers may also vary, for example. In these regards, the operating bandwidth of the RF modulation block 608a may be set to a configurable value ranging from 20 MHz and 80 Mhz, for example. The frequency carriers may utilize a range of carrier frequencies that differ for a signal transmitted via an IEEE 802.11 channel, or an LTE channel, for example. In this regard, the carrier frequencies utilized by the RF modulation block 412a may be configurable. The modulated spatial stream generated by the RF modulation block 412a may be transmitted via antennas 422a and/or 422b, for example. The transmitted signals may be represented by transmitted signal vector X.

The antennas 424a and/or 424b may be operable to receive signals, for example. The received signals may be represented by received signal vector R. The RF demodulation block 412b may comprise suitable logic, circuitry, and/or code that may be adapted to demodulate signals associated with received signal vector R. The operating bandwidth of RF demodulation block 412b may be set to a configurable value corresponding to the corresponding operating bandwidth that was utilized by RF modulation block 412a when generating transmitted signal vector X, for example. The demodulating frequencies utilized by RF demodulation block 412b may be configurable corresponding to the carrier frequencies utilized by RF modulation block 412a when generating transmitted signal vector X, for example.

The guard interval removal block 410b may comprise suitable logic, circuitry, and/or code that may be adapted to remove a guard interval from a received RF signal. The time interval removed by the guard interval removal block 410b may be set to a configurable value ranging from 400 ns and 800 ns, for example.

The FFT 408b may comprise suitable logic, circuitry, and/or code that may be adapted to perform an FFT or discrete Fourier transform (DFT) operation on the signal output from the guard interval removal block 410b. The FFT 408b may be characterized by a number of points where the number of points in the FFT or DFT implementation may, for example, be determined based on a specified time duration and the number of sample observations of the received signal during that specified time duration. For example, in an exemplary embodiment of the invention, the number of FFT or DFT points may correspond to the number of samples observed within at least a portion of the LS field time duration. In an exemplary embodiment of the invention, the portion of the LS field time duration may be equal to a long training symbol time duration, for example, a pilot symbol time duration. Accordingly, the samples may correspond to observation values for one or more pilot symbols within LS field 306, for example.

The pilot and TPS removal block 406b may comprise suitable logic, circuitry, and/or code that may be adapted to remove OFDM pilot symbols and/or transmission parameters symbols from a received signal.

The demapper 404b may comprise suitable logic, circuitry, and/or code that may be adapted to demap a symbol in a received signal into one or more bits based on a specified demodulation constellation. The specified demodulation constellation may be configurable to correspond to the modulation type utilized when generating the transmitted signal, for example. For example, if the corresponding mapper 404a utilized a 16-QAM modulation type, the demapper 404b may utilize a demodulation constellation based on the 16-QAM modulation type.

The decoder 402b may comprise suitable logic, circuitry, and/or code that may be adapted to decode error detection and/or error correction codes in a received signal. The decoding of the error detection and/or error correction code may result in retrieval of the binary information that was encoded by the corresponding inner coder 402a when generating the transmitted signal. For example, the decoder 402b may be adapted to perform decoding based on BCC coding and/or Reed-Solomon FEC coding.

In operation, the pilot symbols removed by the pilot and TPS removal block 306b may be utilized to enable the computation of channel estimate matrix $\hat{H}$. In various embodiments of the invention channel estimate matrix $\hat{H}$ may be inserted by utilizing a method and system for iterative DFT based channel estimation using MMSE techniques.

Referring to FIG. 2, transmitted signal vector X and received signal vector R may be represented as shown in the following equation:

$$R_P = \begin{bmatrix} H_{l(0)} X_{l(0)} \\ H_{l(1)} X_{l(1)} \\ M \\ H_{l(L-1)} X_{l(L-1)} \end{bmatrix} + n = H_P \cdot X_P + n \quad [1]$$

where:

$$H_P = \begin{bmatrix} H_{l(0)} \\ H_{l(1)} \\ M \\ H_{l(L-1)} \end{bmatrix} \quad [2a]$$

$$X_P = \begin{bmatrix} X_{l(0)} \\ X_{l(1)} \\ M \\ X_{l(L-1)} \end{bmatrix} \quad [2b]$$

$$n \square N_c(0, \sigma_N^2 I) \quad [2c]$$

A·B represents the Hadamard product of vectors A and B (such that $[A \cdot B]_i = A_i B_i$). The set l(k) (for $0 \leq k \leq L-1$) represents a set of pilot tone indices.

In equation [1], $R_P$ is a frequency domain representation of pilot symbols in received signal vector R, $X_P$ is a frequency domain representation of pilot symbols in transmitted signal vector X, $H_P$ is a frequency domain representation of channel matrix H that corresponds to pilot tones, matrix I represents an identity matrix and n represents channel noise. L represents the number of pilot positions in, for example, an IFFT or IDFT implementation, I(j) represents an index for a given pilot position (for j=0, 1, 2, . . . , L-1), $H_{l(j)}$ is a channel estimate corresponding to pilot position I(j) and $X_{l(j)}$ is a transmitted signal corresponding to pilot position I(j). In an exemplary embodiment of the invention, the channel noise may be Gaussian distributed in a manner consistent with an additive white Gaussian noise (AWGN) model. In equation [2c], $\sigma^2$ refers to channel noise power.

The time domain representation of channel matrix H may be represented as shown in the following equation:

$$H_T = \begin{bmatrix} h[0] \\ h[1] \\ M \\ h[K-1] \end{bmatrix} \quad [3]$$

where:

$$H_P = D_P H_T \quad [4]$$

In equation [4], $D_P$ is a time domain to frequency domain transformation matrix based on pilot tones, $H_T$ is the time domain representation of channel matrix H, h[j] refers to a $j^{th}$ temporal observation of the RF channel. K represents the number of taps in the time-domain channel response, for example, corresponding to the time duration of a power density profile (PDP). In various embodiments of the invention, the plurality of K observations is less than the number of points in an FFT or DFT implementation. Matrix $D_P$ may be represented as shown in the following equation:

$$D_P = \begin{bmatrix} 1 & e^{-\frac{j2\pi l(0)}{M}} & L & e^{-\frac{j2\pi(K-1)l(0)}{M}} \\ 1 & e^{-\frac{j2\pi l(1)}{M}} & L & e^{-\frac{j2\pi(K-1)l(1)}{M}} \\ M & M & O & M \\ 1 & e^{-\frac{j2\pi l(L-1)}{M}} & L & e^{-\frac{j2\pi(K-1)l(L-1)}{M}} \end{bmatrix} \quad [5]$$

where M represents the FFT or DFT size. In various embodiments of the invention, $D_P \in C^{L \times K}$.

Based on the received signal vector R, a processor 112 within the STA 222 may compute an estimated received signal vector, $R_P'$, as shown in the following equation:

$$R_P' = R_P \cdot X_P' = H_P + n \cdot X_P' \quad [6]$$

where:

$$R_P = \begin{bmatrix} R_{l(0)} X_{l(0)}^* \\ R_{l(1)} X_{l(1)}^* \\ M \\ R_{l(L-1)} X_{l(L-1)}^* \end{bmatrix} \quad [7a]$$

$$X_P' = \begin{bmatrix} X_{l(0)}^* \\ X_{l(1)}^* \\ M \\ X_{l(L-1)}^* \end{bmatrix} \quad [7b]$$

In equation [7a], $X^*_{l(j)}$ represents a complex conjugate values $X_{l(j)}$ in equation [2b] and the distribution of the quantity $n \cdot X_P'$ is the same as the distribution of n as presented in equation [2c]. In an exemplary embodiment of the invention, expected pilot symbol values may be stored in memory 114. A channel estimate matrix may be computed using MMSE techniques as shown in the following equation:

$$\hat{H}_{MMSE} = D([D_P^H D_P + K\sigma_N^2 I]^{-1}(D_P^H R_P')) \quad [8a]$$

where:

$$D = \begin{bmatrix} 1 & 1 & \ldots & 1 \\ 1 & e^{-\frac{j2\pi(1)}{M}} & \ldots & e^{-\frac{j2\pi(K-1)}{M}} \\ \vdots & \vdots & \ddots & \vdots \\ 1 & e^{-\frac{j2\pi(M-1)}{M}} & \ldots & e^{-\frac{j2\pi(K-1)(M-1)}{M}} \end{bmatrix} \quad [8b]$$

In various embodiments of the invention, $D \in C^{M \times K}$.

In equations [8], matrix $\hat{H}_{MMSE}$ refers to the channel estimate matrix computed using MMSE techniques, matrix D refers to a DFT matrix, which corresponds to IDFT matrix $D_P$, and matrix $A^H$ refers to a complex conjugate transpose (or Hermitian transform) version of matrix A. In various embodiments of the invention, matrix $\hat{H}_{MMSE}$ represents the channel estimate matrix for the plurality of tones within an RF channel bandwidth. In various embodiments of the invention, the computed inverse matrix product, $[D_P^H D_P + K\sigma_N^2 I]^{-1}$ from equation [8a], may be stored in memory 114.

An exemplary embodiment of the invention may be practiced when the channel power distribution profile (PDP), as measured across a plurality of K taps in an FFT or DFT implementation for example, is rectangular. However, various embodiments of the invention may be practiced when there is a non-rectangular channel PDP. For example, an exemplary embodiment for which the channel PDP is non-rectangular may be practiced by replacing the identity matrix in the channel noise term, $K\sigma_N^2 I$, from equation [8a], with a non-identity diagonal matrix, for example. In various embodiments of the invention, the inclusion of the channel noise term, $K\sigma_N^2 I$, in the computation of the channel estimate matrix, as shown in equation [8a], may achieve lower computational complexity and may produce more robust and accurate channel estimate value computations in low signal to noise ratio (SNR) regimes in comparison to conventional DFT-based channel estimation methods, which utilize least squares (LS) techniques Matrix $\hat{H}_{MMSE}$ may be represented as shown in the following equation:

$$\hat{H}_{MMSE} = D\left[\frac{D_P^H D_P}{M} + \frac{K\sigma_N^2}{M}I\right]^{-1}\frac{D_P^H}{M}R_P' \quad [9]$$

where:

$$I = \frac{D_P^H D_P + D_Q^H D_Q}{M} \quad [10]$$

where:

$$D_Q = \begin{bmatrix} 1 & e^{-\frac{j2\pi m(0)}{M}} & \cdots & e^{-\frac{j2\pi(K-1)m(0)}{M}} \\ 1 & e^{-\frac{j2\pi m(1)}{M}} & \cdots & e^{-\frac{j2\pi(K-1)m(1)}{M}} \\ \vdots & \vdots & \ddots & \vdots \\ 1 & e^{-\frac{j2\pi m((M-L)-1)}{M}} & \cdots & e^{-\frac{j2\pi(K-1)m((M-L)-1)}{M}} \end{bmatrix} \quad [11]$$

The set m(k) (for $0 \leq k \leq M-L-1$) represents a set of non-pilot tone indices. The set m(k) is mutually exclusive of the set of pilot tone indices l(k) from equation [5]. Jointly, the sets l(k) and m(k) comprise a plurality of M indices, which correspond to a FFT or DFT of size M.

Referring to equation [10], matrix $D_Q$ is a time domain to frequency domain transformation matrix based on non-pilot tones. In various embodiments of the invention, $D_Q \in C^{(M-L) \times K}$.

Equation [9] may be represented as shown in the following equations:

$$\hat{H}_{MMSE} = D\left[\left(1 + \frac{K\sigma_N^2}{M}\right)I - \frac{D_Q^H D_Q}{M}\right]^{-1}\frac{D_P^H}{M}R_P' \quad [12]$$

and:

$$\hat{H}_{MMSE} = D\left(\sum_{j=0}^{\infty}\left(\frac{D_Q^H D_Q}{M + K\sigma_N^2}\right)^j\right)\frac{D_P^H}{M + K\sigma_N^2}R_P' \quad [13]$$

and:

$$\hat{H}_{MMSE} = DH^{\infty} \quad [14]$$

Referring to equation [14], $H_T^{\infty}$ represents a convergence value for the time domain representation of channel matrix H. The convergence value represents an asymptotic value for an $i^{th}$ iteration (for $i \to \infty$) time domain channel matrix, $H_T^i$, which is iteratively computed in accordance with an embodiment of the invention. In various embodiments of the invention, $H_T^i \in C^{K \times 1}$. Various embodiments of the invention, comprise a procedure for iteratively computing time domain channel matrix $H_T^i$.

Figure 5:
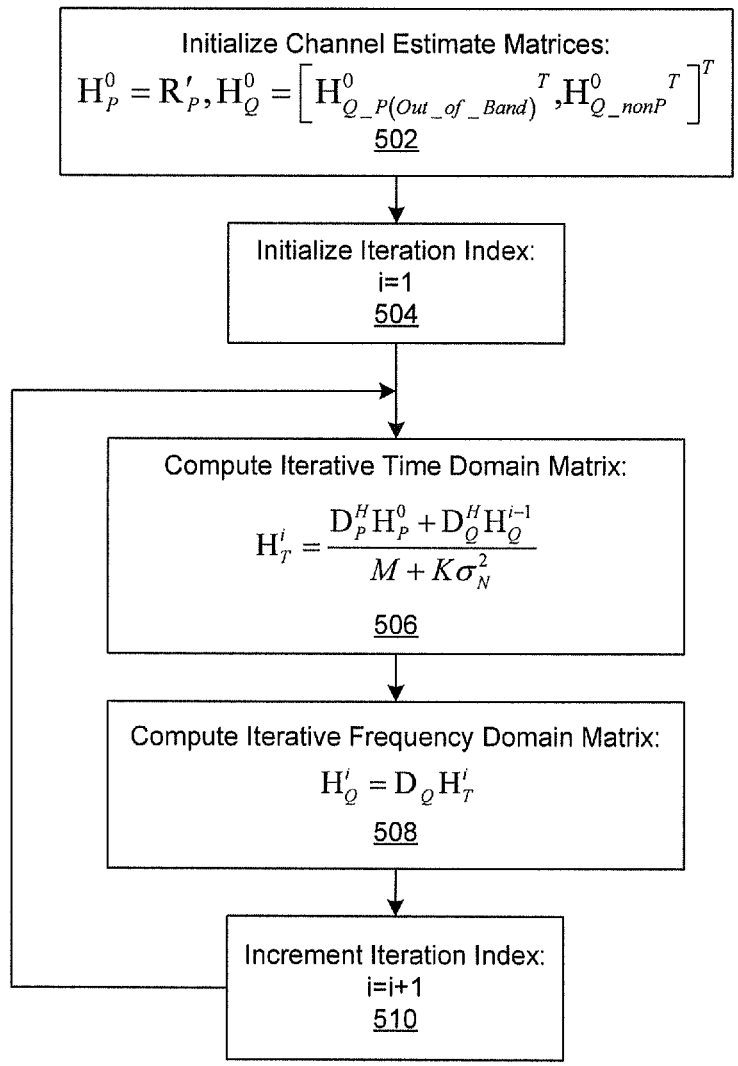
FIG. 5 is a flowchart that illustrates exemplary steps for iterative channel estimation, in accordance with an embodiment of the invention.

FIG. 5 is a flowchart that illustrates exemplary steps for iterative channel estimation, in accordance with an embodiment of the invention. Referring to FIG. 5, in step 502, an initial value is set for the frequency domain channel matrix based on the frequency domain representation of the received pilot tones, $R_P'$: $H_P^0 = R_P'$. In addition, an initial value is set for the frequency domain channel matrix based on non-pilot tones, $H_Q^0 = [H_{Q\_P(Out\_of\_Band)}^{0T}, H_{Q\_nonP}^{0T}]^T$, where $H_{Q\_P(Out\_of\_Band)}^0 = R_{P(Nearest\_Edge)}'$ and $H_{Q\_nonP}^0 = 0$. $H_{Q\_P(Out\_of\_Band)}^0$ represents tones that are outside of the current RF channel bandwidth that would be pilot tones if they were within the RF channel bandwidth, where $H_{Q\_P(Out\_of\_Band)}^{0T}$ represents the transposed version of $H_{Q\_P(Out\_of\_Band)}^0$. The initialized value $H_{Q\_P(Out\_of\_Band)}^0$ is set equal to the value of the nearest within-band pilot tone, referred to as $R_{P(Nearest\_Edge)}'$. $H_{Q\_nonP}^0$ represents used and unused tones, both within-band and out-of-band, that are not pilot tones, where $H_{Q\_nonP}^{0T}$ represents the transposed version of $H_{Q\_nonP}^0$. The vector $[H_{Q\_P(Out\_of\_Band)}^{0T}, H_{Q\_nonP}^{0T}]^T$ represents a transposed version of the vector represented as $[H_{Q\_P(Out\_of\_Band)}^{0T}, H_{Q\_nonP}^{0T}]$. In various embodiments of the invention, $H_P^i \in C^{L \times 1}$ and $H_Q^i \in C^{(M-1) \times 1}$.

In an exemplary embodiment of the invention, each of the taps in an FFT implementation may correspond to a tone index. For example in a 512-tap FFT implementation, tone indexes from −150 to −1 and 1 to 150 may correspond to in-band tones, while tone indexes from −256 to −151 and from 151 to 256 may correspond to out-of-band tones. Within each respective band, pilot tones may be spaced 6 tones apart, for example, in-band pilot tones may be located at indexes 150, 144, . . . , −6 and 6, 12, . . . , 150, while out-of-band tones may be located at indexes −156, −162, . . . , −252 and 156, 162, . . . , 252. An initialized value for tone position 0, represented as R'[0], may be computed by averaging the values of the nearest pilot tones at indexes −6 and 6, respectively: R'[0]=(R'[−6]+R'[6])/2. For tone positions −156, −162, . . . , −252, $H_{Q\_P(Out\_of\_Band)}^0$ is initialized to the value of the pilot tone at index −150, represented as R'[−150]. For tone positions 6, 12, . . . , 252, $H_{Q\_P(Out\_of\_Band)}^0$ is initialized to the value of the pilot tone at index 150, represented as R'[150]. In instances where an out-of-band pilot tone position is equidistant from both nearest edge pilot tone, referred to as a left-edge pilot tone and a right-edge pilot tone, the value of the equidistant out-of-band pilot tone may be initialized by averaging the values of the left-edge pilot tone and the right-edge pilot tone.

In step, 504, the iteration index is initialized, i=1. In step 506, the time domain channel matrix, $H_T^i$, is computed for the current iteration as shown in the following equation:

$$H_T^i = \frac{D_P^H H_P^0 + D_Q^H H_Q^{i-1}}{M + K\sigma_N^2} \quad [15]$$

where the value of the variable i, in equation [15], corresponds to the current value of the iteration index, M represents the total number of tones in the RF channel bandwidth, K represents the number of temporal observations of a signal received via the RF channel and $\sigma_N^2$ represents noise power associated with the RF channel.

In step 508, the frequency domain channel matrix based on non-pilot tones, $H_Q^i$, is computed for the current iteration as shown in the following equation:

$$H_Q^i = D_Q H_T^i \quad [16]$$

where $H_T^i$ is as computed in equation [15].

In step 510, the iteration index is incremented: i=i+1. Step 506 follows step 510, which begins the computation of next iteration values for $H_T^i$ and $H_Q^i$.

In various embodiments of the invention, the iteration loop may terminate for iteration index values i>>1. Upon termination of the iteration loop, $\hat{H}_{MMSE}$ may be approximated as shown in the following equation:

$$\hat{H}_{MMSE} \approx DH_T^N \quad [17]$$

where N represents the iteration index value in the final iteration and $H_T^N$ represents the time domain channel matrix after the $N^{th}$ iteration.

The computed channel estimate matrix $\hat{H}_{MMSE}$ may be utilized at STA 222 to enable the subsequent reception and decoding of the signal and data payload portions of the current received PPDU.

Various embodiments of a method for iterative DFT based channel estimation using MMSE techniques comprise receiving a signal, R, at a STA 222 via an RF channel wherein the RF channel comprises a plurality of frequencies in an RF channel bandwidth. The received signal may comprise pilot tones. A processor 112 within the STA 222 may compute one or more channel estimate values, $H_P$, based on the received signal, R, for frequencies within the RF channel bandwidth that correspond to the pilot tones. The processor 112 may compute one or more subsequent channel estimate values, $H_Q$, for non-pilot tones within the RF channel bandwidth based on the computed $H_P$ and a channel noise value for the RF channel, $\sigma_N^2$.

During the iterative computation of $H_Q$, the processor 112 may determine an initial value, $H_Q$=0. The processor 112 may compute one or more time domain current iteration values, $H_T^i$ (where i represents a current iteration index value), for the RF channel based on the initial $H_Q$ values, the $H_P$ values, and the channel noise value, $\sigma_N^2$, as shown in equation [15]. The processor 112 may compute one or more frequency domain current iteration values, $H_Q^i$, based on the one or more iteration time domain current iteration values $H_T^i$ and a conversion matrix $D_Q$, as shown in equation [16]. The conversion matrix may be based on the non-pilot tone frequencies within the RF channel bandwidth.

The processor 112 may compute one or more time domain subsequent iteration values, $H_T^{i+1}$, for the RF channel, based on the one or more frequency domain current iteration values, $H_Q^i$, the one or more channel estimate values, $H_P$, and the channel noise value $\sigma_N^2$. The processor 112 may compute one or more frequency domain subsequent iteration values, $H_Q^{i+1}$, based on $H_T^{i+1}$ and the conversion matrix, $D_Q$. The processor 112 may compute channel estimates $H_Q$ based on the frequency domain subsequent iteration values $H_Q^{i+1}$ for values i>>1. The processor may compute a channel estimate matrix, $\hat{H}_{MMSE}$, based on matrices $H_P^0$ and $H_Q^i$ as shown in equation [17].

Another embodiment of the invention may provide a computer readable medium, having stored thereon, a computer program having at least one code section executable by a computer, thereby causing the computer to perform the steps as described herein for iterative discrete Fourier transform (DFT) based channel estimation using minimum mean square error (MMSE) techniques.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
    performing by one or more processors and/or circuits:
    receiving a signal via a radio frequency (RF) channel, wherein said RF channel comprises a plurality of frequencies;
    computing one or more channel estimate values for a portion of said plurality of frequencies based on said received signal; and
    computing one or more subsequent channel estimate values for at least a subsequent portion of said plurality of frequencies by iteratively computing a time domain channel matrix and a frequency domain channel matrix based on said computed one or more channel estimate values and a channel noise value for said RF channel,
    wherein iteratively computing the frequency domain channel matrix includes applying a time-to-frequency transformation matrix to the time domain channel matrix, the time-to-frequency transformation matrix being computed using non-pilot tone frequencies.

2. The method according to claim 1, wherein said portion of said plurality of frequencies comprises pilot tone frequencies.

3. The method according to claim 1, further comprising:
    determining one or more initial values for said one or more subsequent channel estimate values.

4. The method according to claim 3, wherein said one or more initial values are each equal to 0.

5. The method according to claim 3, wherein computing one or more subsequent channel estimate values includes using a minimum mean square error algorithm.

6. A method for processing signals, the method comprising:
 performing by one or more processors and/or circuits:
 receiving a signal via a radio frequency (RF) channel, wherein said RF channel comprises a plurality of frequencies;
 computing one or more channel estimate values for a portion of said plurality of frequencies based on said received signal;
 computing one or more subsequent channel estimate values for at least a subsequent portion of said plurality of frequencies based on said computed one or more channel estimate values and a channel noise value for said RF channel;
 determining one or more initial values for said one or more subsequent channel estimate values;
 computing one or more time domain current iteration values for said RF channel based on said one or more initial values, said one or more channel estimate values and said channel noise value; and
 computing one or more frequency domain current iteration values for said at least said subsequent portion of said plurality of frequencies based on said one or more time domain current iteration values and a conversion matrix, wherein said conversion matrix is based on said at least said subsequent portion of said plurality of frequencies.

7. The method according to claim 6, further comprising:
 computing one or more time domain subsequent iteration values for said RF channel based on said one or more frequency domain current iteration values, said one or more channel estimate values and said channel noise value.

8. The method according to claim 7, further comprising:
 computing one or more frequency domain subsequent iteration values for said at least said subsequent portion of said plurality of frequencies based on said one or more time domain subsequent iteration values and said conversion matrix.

9. The method according to claim 8, further comprising:
 computing said one or more subsequent channel estimate values based on said one or more frequency domain subsequent iteration values.

10. The method according to claim 8, further comprising:
 computing a channel estimate matrix for said RF channel based on a matrix generated from said one or more frequency domain subsequent iteration values and a matrix generated from said one or more channel estimate values.

11. A system for processing signals, the system comprising:
 one or more circuits that enable reception of a signal via a radio frequency (RF) channel, wherein said RF channel comprises a plurality of frequencies;
 wherein said one or more circuits enable computation of one or more channel estimate values for a portion of said plurality of frequencies based on said received signal;
 wherein said one or more circuits enable computation of one or more subsequent channel estimate values for at least a subsequent portion of said plurality of frequencies by iteratively computing a time domain channel matrix and a frequency domain channel matrix based on said computed one or more channel estimate values and a channel noise value for said RF channel, and
 wherein iteratively computing the frequency domain channel matrix includes applying a time-to-frequency transformation matrix to the time domain channel matrix, the time-to-frequency transformation matrix being computed using non-pilot tone frequencies.

12. The system according to claim 11, wherein said portion of said plurality of frequencies comprises pilot tone frequencies.

13. The system according to claim 11, wherein said one or more circuits further enable determination of one or more initial values for said one or more subsequent channel estimate values.

14. The system according to claim 13, wherein said one or more initial values are each equal to 0.

15. The system according to claim 13, wherein said one or more circuits further enable computation of one or more subsequent channel estimate values by using a minimum mean square error algorithm.

16. A system for processing signals, the system comprising:
 one or more circuits that enable reception of a signal via a radio frequency (RF) channel, wherein said RF channel comprises a plurality of frequencies;
 wherein said one or more circuits enable computation of one or more channel estimate values for a portion of said plurality of frequencies based on said received signal;
 wherein said one or more circuits enable computation of one or more subsequent channel estimate values for at least a subsequent portion of said plurality of frequencies based on said computed one or more channel estimate values and a channel noise value for said RF channel;
 wherein said one or more circuits enable determination of one or more initial values for said one or more subsequent channel estimate values;
 wherein said one or more circuits enable computation of one or more time domain current iteration values for said RF channel based on said one or more initial values, said one or more channel estimate values and said channel noise value; and
 wherein said one or more circuits further enable computation of one or more frequency domain current iteration values for said at least said subsequent portion of said plurality of frequencies based on said one or more time domain current iteration values and a conversion matrix, wherein said conversion matrix is based on said at least said subsequent portion of said plurality of frequencies.

17. The system according to claim 16, wherein said one or more circuits further enable computation of one or more time domain subsequent iteration values for said RF channel based on said one or more frequency domain cur-ent iteration values, said one or more channel estimate values and said channel noise value.

18. The system according to claim 17, wherein said one or more circuits further enable computation of one or more frequency domain subsequent iteration values for said at least said subsequent portion of said plurality of frequencies based on said one or more time domain subsequent iteration values and said conversion matrix.

19. The system according to claim 18, wherein said one or more circuits further enable computation of said one or more subsequent charnel estimate values based on said one or more frequency domain subsequent iteration values.

20. The system according to claim 18, wherein said one or more circuits further enable computation of a channel estimate matrix for said RF channel based on a matrix generated from said one or more frequency domain subsequent iteration values and a matrix generated from said one or more channel estimate values.

* * * * *

UNITED STATES PATENT AND TRADEMARK OFFICE
CERTIFICATE OF CORRECTION

| | | |
|---|---|---|
| PATENT NO. | : 8,750,089 B2 | Page 1 of 1 |
| APPLICATION NO. | : 12/732975 | |
| DATED | : June 10, 2014 | |
| INVENTOR(S) | : Ariyavisitakul et al. | |

It is certified that error appears in the above-identified patent and that said Letters Patent is hereby corrected as shown below:

In the Claims

Column 16, line 47, Claim 17, replace "frequency domain cur-ent" with --frequency domain current--.

Signed and Sealed this
Eleventh Day of November, 2014

Michelle K. Lee
*Deputy Director of the United States Patent and Trademark Office*